(12) United States Patent
Yxklinten

(10) Patent No.: US 6,173,789 B1
(45) Date of Patent: Jan. 16, 2001

(54) HORSE SHOE

(75) Inventor: Uno Yxklinten, Helsingborg (SE)

(73) Assignee: Press & Form i Halmstad AB (SE)

( * ) Notice: Under 35 U.S.C. 154(b), the term of this patent shall be extended for 0 days.

(21) Appl. No.: 09/325,438

(22) Filed: Jun. 3, 1999

Related U.S. Application Data

(63) Continuation of application No. PCT/SE97/02003, filed on Dec. 1, 1997.

(51) Int. Cl.$^7$ ................. A01L 5/00; A01L 1/04
(52) U.S. Cl. ........................... 168/4; 168/DIG. 1
(58) Field of Search ................... 168/4, 13, 23, 168/DIG. 1

(56) References Cited

U.S. PATENT DOCUMENTS

| | | | | |
|---|---|---|---|---|
| 168,369 | * | 10/1875 | Brown | 168/13 |
| 777,684 | * | 12/1904 | Messinger | 168/13 |
| 2,024,265 | * | 12/1935 | Anderson et al. | 168/4 |
| 5,918,678 | * | 7/1999 | Pederson | 168/4 |

FOREIGN PATENT DOCUMENTS

| | | |
|---|---|---|
| 1626 | 5/1902 | (GB) . |
| 5249 | 8/1905 | (GB) . |
| WO 94/22296 | 10/1994 | (WO) . |
| WO 98/24312 | 6/1998 | (WO) . |

* cited by examiner

Primary Examiner—Robert P. Swiatek
(74) Attorney, Agent, or Firm—Rader, Fishman, Grauer & McGarry, an office of Rader, Fishman & Grauer

(57) ABSTRACT

A horse shoe comprising a core of metal, which is substantially entirely enclosed in a substantially elastically deformable material, such as a rubber or rubber-like material. The thickness of the deformable material is considerably greater on the underside of the core than on its upper side. The holes which extend extend through the horse shoe are for nails. The width of the lower surface of the horse shoe intended for contact with the ground is narrower than its upper surface intended for contact with the hoof throughout the entire service life of the horse shoe.

26 Claims, 3 Drawing Sheets

HORSE SHOE

CROSS REFERENCE TO RELATED APPLICATIONS

This application is a continuation of International Application Serial No. PCT/SE97/02003, filed Dec. 1, 1997, which claims priority from Swedish Application No. 9604485-4, filed Dec. 5, 1996.

TECHNICAL FIELD

The present invention relates to a horse shoe which comprises a core of metal which is substantially entirely enclosed in a substantially elastically deformable material such as a rubber or rubber-like material, the thickness of the deformable material being considerably greater on the underside of the core than on its upper side, and holes for nails extending through the horse shoe.

BACKGROUND ART

WO94/22296 discloses a horse shoe of the type mentioned by way of introduction. A horse shoe of this type enjoys major advantages in that it effectively damps impact and jolts against the hoof, in particular if the horse is running on hard ground.

FIGS. 1, 2 and 3 show the prior art horse shoe. It will be particularly apparent from FIG. 2 that the outer side of the prior art horse shoe is substantially smooth and approximately at right angles to the plane of the horse shoe when the horse shoe is not under loading. FIG. 3 shows the same cross section in which, however, the section has been greatly deformed in that the rubber material has been compressed such that the outer side of the shoe inclines, in a downward direction, manifestly outwards from the centre point for the shoe.

In particular in cold weather, typically temperatures lower than −5° C., cracks occur in the prior art horse shoe, in particular in the region of the nail holes and out towards the outside of the shoe. If unevenness in the ground comes into contact with the deformed shoe, particularly the edge region at the outside of the shoe where the rubber material is under great stress, cracks readily occur in the material. Such loadings may even be so great that whole pieces of the rubber material are broken off.

At higher temperatures, this problem is less severe, since the movements in the rubber material will be more uniformly distributed throughout its entire volume.

Because the rubber is visco-elastic, a horse shoe of the type under consideration here shows a tendency to undergo plastic alterations after a period of use. Such plastic alterations deform the cross section of the horse shoe from the appearance illustrated in FIG. 2 in direction towards (or even beyond) the appearance illustrated in FIG. 3, such that, after a period of use and under loading, the horse shoe may become considerably wider at its lower edge than is the case at its upper side. If a deformed horse shoe in accordance with the foregoing is subjected to loading against an uneven substrate, the deformation will naturally be even greater locally, whereby very large local stress peaks occur such that the problem is aggravated.

Those areas of the prior art horse shoe which are particularly vulnerable are the areas surrounding the nail holes.

PROBLEM STRUCTURE

The present invention has for its object to design the horse shoe intimated by way of introduction such that it obviates the problems inherent in the prior art. In particular, the present invention has for its object to design the horse shoe such that it may be employed also in cold weather without risk of damage. The present invention further has for its object to design the horse shoe such that it will have considerably extended service life and such that the plastic deformation in the horse shoe does not impair the mechanical strength of the horse shoe after a lengthy period of use.

SOLUTION

The objects forming the basis of the present invention will be attained if the horse shoe intimated by way of introduction is characterized in that the width of the surface of the horse shoe intended for contact with the ground is narrower than its upper surface intended for contact with the hoof, throughout the entire service life of the horse shoe.

Further advantages will be attained if the horse shoe is also given one or more of the characterizing features as set forth in appended subclaims 2 to 14.

BRIEF DESCRIPTION OF THE ACCOMPANYING DRAWINGS

The present invention will now be described in greater detail hereinbelow, with particular reference to the accompanying Drawings, in which.

DESCRIPTION OF PREFERRED EMBODIMENT

The horse shoe according to the present invention has an inner core 1 of metal or other hard, configurationally stable material. The fore is substantially entirely cast or enclosed in a rubber or rubber-like material which has substantially elastic properties, but also an inner damping and possibly also a plastic deformation which progresses with time. In the vertical direction, the core 1 is located more proximal the upper side 3 of the rubber material or rubber-like material 2 than its lower side 4. The thickness S in the vertical direction of the core 1 may lie-in the order of magnitude of 3 mm, preferably 4–5 mm. In the lateral direction, the core 1 has approximately the same fundamental configuration as the rest of the horse shoe, but is somewhat narrower so that the core is embedded in the rubber material 2 also in its side edges.

The rubber material 2 between the core 1 and the upper side 3 of the horse shoe is thin, of the order of magnitude of 0.5–2 mm. On the other hand, the thickness of the rubber material 2 is considerably greater on the underside of the core 1 and amounts at least to the thickness of the core, possibly approximately 1½ times. A horse shoe of this type has a total height or thickness which is greater than the thickness of a traditional horse shoe.

Figure 1:
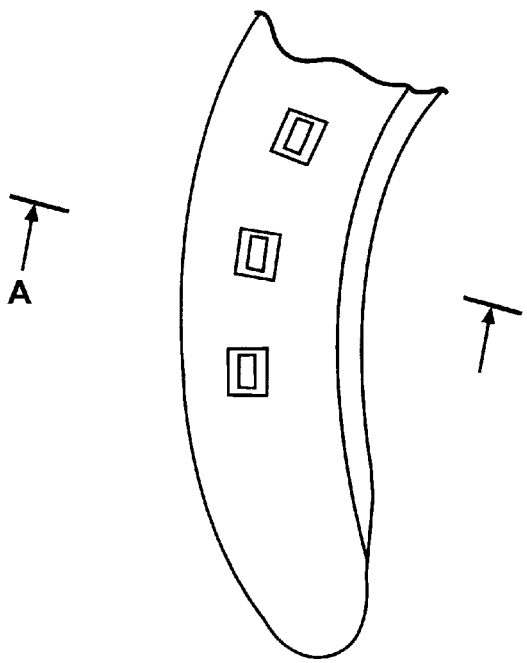
FIG. 1 is a view from beneath of a portion of a prior art horse shoe.
Figure 2:
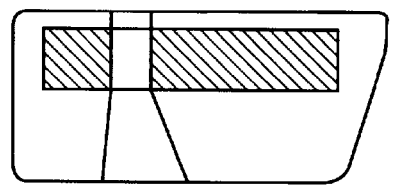
FIG. 2 is a section taken along the section marking A in FIG. 1 when the horse shoe is not under loading.
Figure 3:
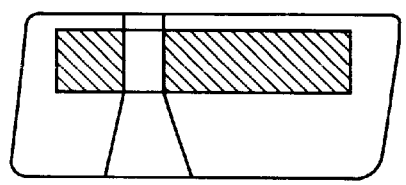
FIG. 3 is a section taken along the section marking A in FIG. 1 when the horse shoe is under loading or plastically deformed.
Figure 4:
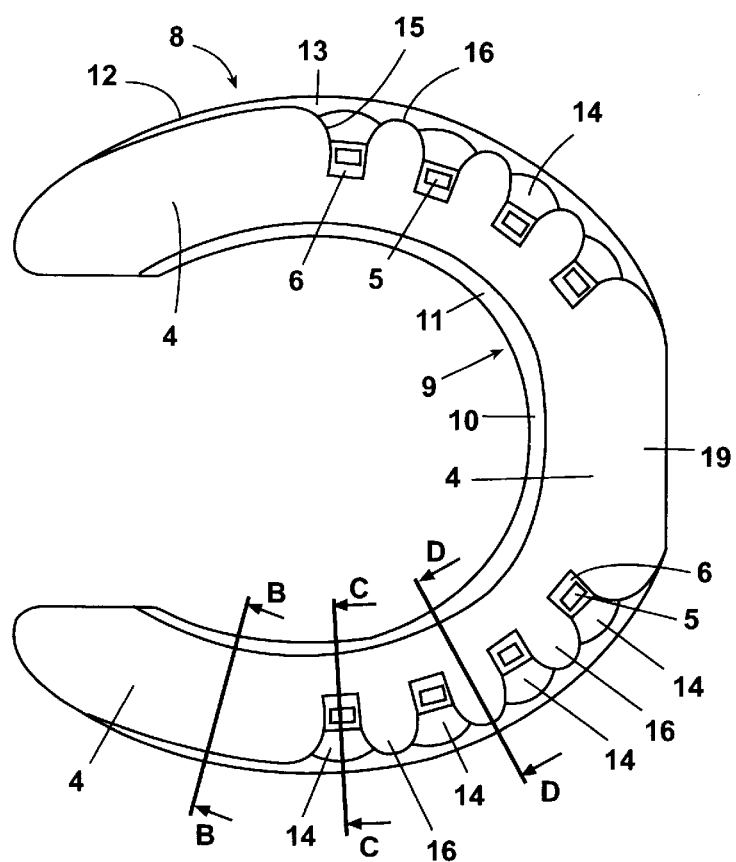
FIG. 4 is a view of the subject matter of the present invention straight from beneath.
Figure 5:
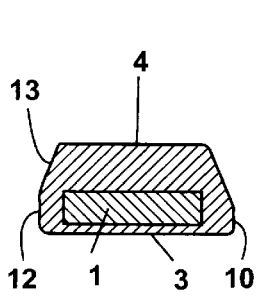
FIG. 5 is a section taken along the section marking B—B in FIG. 4.
Figure 6:
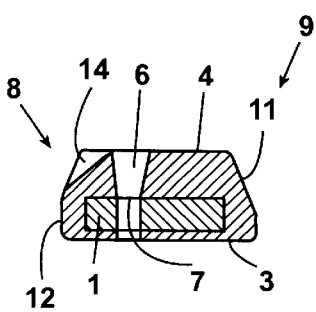
FIG. 6 is a section taken along the section marking C—C in FIG. 4.
Figure 7:
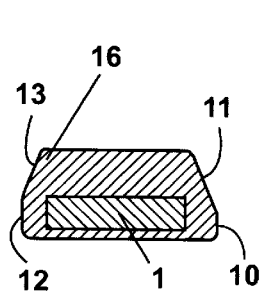
FIG. 7 is a section taken along the section marking D—D in FIG. 4.

Nail holes 5 extend through the horse shoe from the underside 4 of the horse shoe, through the core 1 and up to the upper side 3 of the horse shoe. The nail holes 5 have lower regions 6 (FIG. 6) which taper from the underside 4 in an upward direction towards the core 1. The nail holes 5 are preferably of constant cross section through the core 1 and the thin rubber layer on the upper side of the core. The transition between the lower region 6 and the area with constant cross section lies vertically flush with the upper side 7 of the core.

Figure 9:
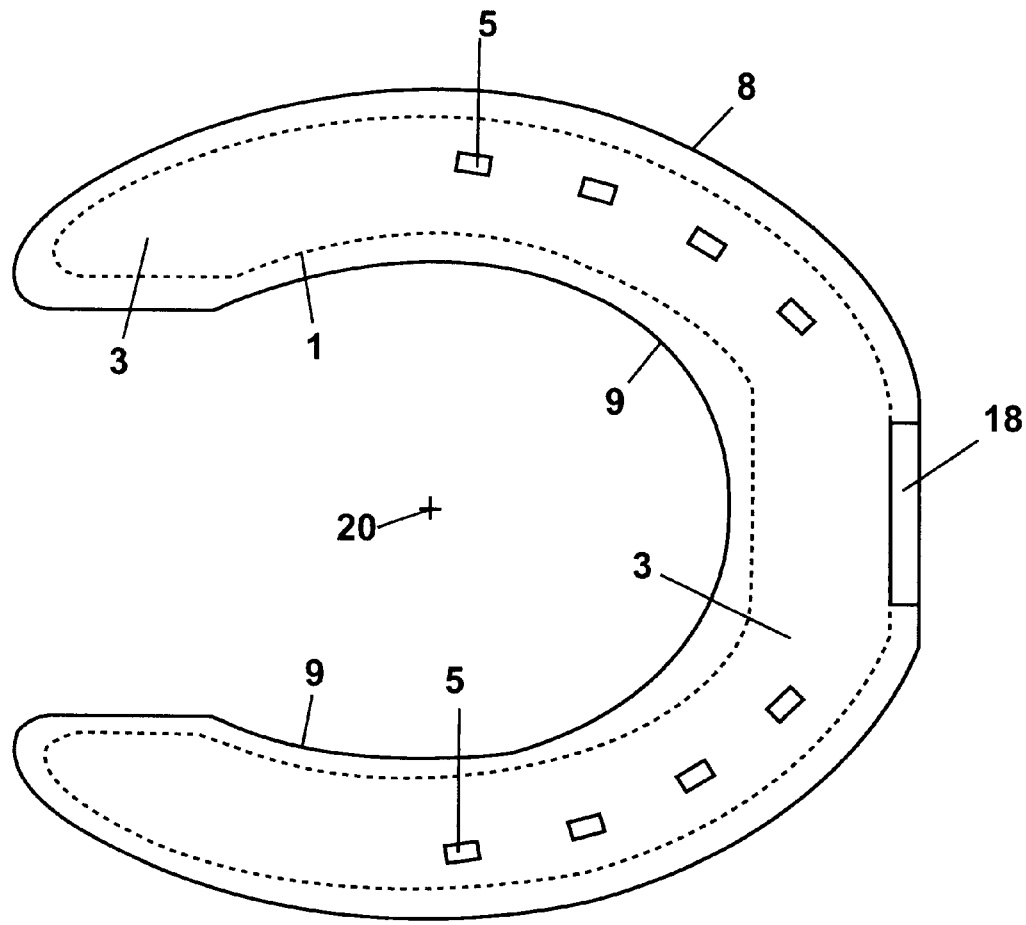
FIG. 9 is a top plan view of the horse shoe according to FIG. 4.

The horse shoe has an outer edge surface 8 and a corresponding inner edge surface 9. According to the present invention, at least the outer edge surface 8 slopes in a downward direction in towards a centre point 20 for the horse shoe (see FIG. 9). The slope is such that the underside of-the horse shoe intended for contact with the ground is narrower than its upper side which is intended for contact with the hoof.

Preferably, the inner edge surface also slopes in a downward direction outwards from a centre point 20 for the horse shoe so that the inner and outer edge surfaces thereby converge in a downward direction.

The slope of the edge surface or edge surfaces is such that, still while under loading and even after a plastic deformation of the horse shoe caused by time, the underside 4 is still narrower than the upper side 3, counting radially outwards from a centre point for the horse shoe.

The inner edge surface 9 has an upper portion 10 which is approximately vertical or at right angles to the plane of the horse shoe. This band-shaped and substantially vertical portion 10 of the inner edge surface 9 extends from the upper side of the horse shoe and downwards approximately to a level with the underside 7 of the core 1. Possibly however, the upper portion 10 may be somewhat narrower so that, in the vertical direction, it terminates slightly above the underside 7 of the core 1.

The inner edge surface 9 further has a lower portion 11 which is obliquely inclined in a downward direction out from a centre point 20 for the horse shoe. The transition between the lower portion 11 and the upper side 3 is gently rounded, with a radius of the order of magnitude of 1–2 mm.

The outer edge surface 8 is of a design which corresponds to the inner edge surface 9 and, as a result, has an upper portion 12 which is approximately vertical or at right angles to the plane of the horse shoe. The outer edge surface 8 further has a lower portion 13 which, in a downward direction, slopes inwards towards a centre point 20 for the horse shoe. The transition between the lower portion 13 and the underside 4 of the horse shoe is gently rounded, with a radius of the order of magnitude of 1–2 mm.

The transitions between the two edge surfaces 8 and 9 and the upper side of the horse shoe are also slightly rounded.

The outer edge surface 8 of the horse shoe has a number of depressions 14, on the Drawings the same in number as the number of nail holes 5. However, a different number of depressions may be employed, both greater and fewer in number than the number of nail holes.

Figure 8:
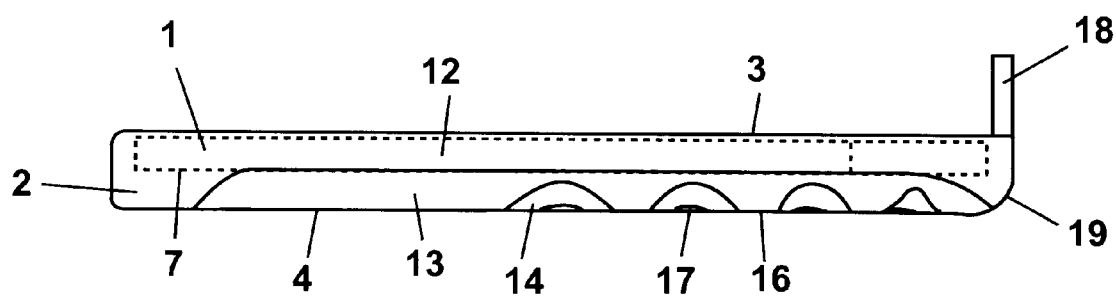
FIG. 8 is a straight side elevation of the horse shoe according to FIG. 4.

The depressions 14 are open in a downward direction towards the under side 3 of the horse shoe, for which reason an edge line between the under side and the outer edge surface will have inward bulges 15 at each depression and arched outward bulges 16 between them. The depressions 14 have approximately conical defining surfaces, the major end of the cone being turned to face downwards. The depth of the depressions (in the horizontal direction) is such that the inner defining surface of the depression is located in the region of the lower edge of a nail hole 5, at least for those depressions 14 which are located in register with the nail holes. The depressions 14 are further such that the edge line between the inner surface of the depression and the nail hole will, as is apparent from FIG. 8, be somewhat arched according to the line 17, i.e. the lower regions 6 of the nail holes 5 have their lower and outer parts common with the adjacent depression 14.

The upper ends of the depressions 14 are located in the vertical direction a distance from the upper side 3 of the horse shoe. Suitably, the depressions 14 may extend to approximately flush with the under side 7 of the core 1.

The transition between the depressions 14 and adjacent surfaces of the horse shoe is gently arched or rounded. It further applies that the width of the under side of the horse shoe is approximately the same throughout all parts of the horse shoe where there are no depressions 14.

At its front end, the horse shoe has a toecap 18 which extends upwards from the upper side of the horse shoe. In the area below the toecap 18 and in the transition between the outer edge surface 8 and the under side 4 of the horse shoe, there is disposed a gently arched portion 19 which is of greater, possibly considerably greater radius of curvature than that which applies to other transitions between the edge surfaces 8 and 9 and the underside 4.

The present invention may be modified without departing from the scope of the appended claims.

What is claimed is:

1. A horse shoe comprising:
    a core of substantially non-deformable material; and
    an outer layer of elastically deformable material substantially enclosing the core and defining an upper surface positioned above the core, a lower surface positioned below the core, and opposing inner and outer edge surfaces connecting the upper surface to the lower surface, with at least a portion of the inner and outer edge surfaces converging toward each other in a direction from the top surface toward the lower surface, and the convergence being great enough so that the converge remains, a under loading.

2. The horse shoe as claimed in claim 1, wherein the outer edge surface of the horse shoe, at least along a portion below the core which covers a considerable portion of the outer circumference of the horse shoe, slopes in a downward direction in towards a centre point for the horse shoe.

3. The horse shoe as claimed in any of claims 2, wherein the outer edge surface of the horse shoe has a number of depressions which are open downwards such that an outer edge line between the lower surface of the horse shoe and its outer edge surface will have inward bulges in the region of the depressions.

4. The horse shoe as claimed in claim 3, wherein the depressions have approximately conical defining surfaces.

5. The horse shoe as claimed in claim 4, and further comprising multiple nail openings extending through the core and outer layer and wherein a depression is disposed in register with at least the majority of nail openings.

6. The horse shoe as claimed in claim 5, wherein the depressions, at their lower ends, extend in a direction in towards the centre point for the horse shoe to areas of the outer edges of the nail openings.

7. The horse shoe as claimed in claim 6, wherein the transition between a depression and adjacent surfaces of the horse shoe is gently rounded.

8. The horse shoe as claimed in claim 2, wherein the inner edge surface of the horse shoe, at least along a portion beneath the core which covers a considerable portion of the inner circumference of the horse shoe, slopes in a downward direction out from a centre point for the horse shoe.

9. The horse shoe as claimed in claim 8, wherein both the outer and the inner edge surfaces respectively slope inwardly and outwardly in relation to the centre point for the horse shoe.

10. The horse shoe as claimed in claim 9, wherein the outer edge surface of the horse shoe has a number of depressions which are open downwards such that an outer edge line between the lower surface of the horse shoe and its outer edge surface will have inward bulges in the region of the depressions.

11. The horse shoe as claimed in claim 10, wherein upper ends of the depressions are located a distance from the upper surface of the horse shoe.

12. The horse shoe as claimed in claim 11, wherein the upper ends of the depressions are located on approximately the same level as the under side of the core.

13. The horse shoe as claimed in claim 12, wherein the depressions have approximately conical defining surfaces.

14. The horse shoe as claimed in claim 13, and further comprising multiple nail openings extending through the core and wherein a depression is disposed in register with at least the majority of the [holes intended for nails] nail openings.

15. The horse shoe as claimed in claim 14, wherein the depressions, at their lower ends, extend in a direction in towards the centre point of the horse shoe to areas of the outer edges of the holes which are intended for nails.

16. The horse shoe as claimed in claim 15, wherein the transition between the lower surface of the horse shoe and its outer edge surface is gently rounded, at least along the greater part of the circumference of the horse shoe.

17. The horse shoe as claimed in claim 16, wherein the transition between the lower surface of the horse shoe and its inner edge surface is gently rounded, at least along the greater part of the inner circumference of the horse shoe.

18. The horse shoe as claimed in claim 17, wherein the transition between a depression and adjacent surfaces of the horse shoe is gently rounded.

19. The horse shoe as claimed in claim 1 wherein the core is made from metal.

20. The horse shoe as claimed in claim 1 wherein the outer layer is made of rubber.

21. The horse shoe as claimed in claim 1 wherein the convergence is great enough so that the convergence remains, even after the outer layer has undergone plastic deformation.

22. A horse shoe which comprises:
   a core of metal;
   an elastically deformable material substantially entirely enclosing the metal core, the thickness of the deformable material being considerably greater on an underside of the core than on an upper side;
   the deformable material having an upper surface above the core for contact with a hoof, a lower surface below the core for contact with the ground, and an outer edge surface, connecting the upper and lower surfaces, and provided at least along a lower ground engaging portion of the horse shoe and covering a considerable portion of the outer circumference of the horse shoe, the outer edge surface slopes in a downward direction in towards a centre point for the horse shoe, and the width of the lower surface is narrower than its upper surface, throughout the entire service life of the horse shoe;
   a number of depressions provided on the outer edge surface and which are open downwards such that an outer edge line between the lower surface of the horse shoe and its outer edge surface will have inward bulges in the region of the depressions; and
   holes for nails extending through the horse shoe.

23. The horse shoe as claimed in claim 22, wherein the lower surface of the horse shoe is of approximately the same width along the greater part of those portions which have no depressions.

24. The horse shoe as claimed in claim 22, wherein the elastically deformable material is rubber.

25. A horse shoe which comprises:
   a core of metal;
   an elastically deformable material substantially entirely enclosing the core, the thickness of the deformable material being considerably greater on the underside of the core than on its upper side;
   the deformable material having an upper surface above the core for contact with the hoof, a lower surface below the core for contact with the ground, with the width of the lower surface being narrower than the upper surface, throughout the entire service life of the horse shoe, and the deformable material comprising:
      an outer edge surface extending between the upper and lower surfaces, covering a considerable portion of the outer circumference of the horse shoe, and sloping in a downward direction in towards a centre point for the horse shoe, and
      an inner edge surface connecting the upper and lower surfaces, covering a considerable portion of the inner circumference of the horse shoe, and sloping in a downward direction out from a centre point for the horse shoe;
   holes for nails extending through the horse shoe; and
   a number of depressions formed in the outer edge surface and which open downwards such that an outer edge line between the lower surface of the horse shoe and its outer edge surface will have inward bulges in the region of the depressions.

26. A horse shoe comprising:
   a core of substantially non-deformable material; and
   an outer layer of elastically deformable material substantially enclosing the core and defining an upper surface positioned above the core, a lower surface positioned below the core, and opposing inner and outer edge surfaces connecting the upper surface to the lower surface, with at least a portion of the inner and outer edge surfaces converging towards each other in a direction from the upper surface toward the lower surface, and the convergence being great enough so that the convergence remains even after the elastically deformable material has undergone a long term plastic deformation.

* * * * *

UNITED STATES PATENT AND TRADEMARK OFFICE
CERTIFICATE OF CORRECTION

PATENT NO.   : 6,173,789 B1
DATED        : January 16, 2001
INVENTOR(S)  : Uno Yxklinten It is certified that error appears in the above-identified patent and that said Letters Patent is hereby corrected as shown below:

Title page,
Item [73], Assignee should include "Sweden" after the company name

Column 4,
Claim 1, lines 45-46, "converge remains, a" should read -- convergence remains, also"
Claim 3, line 52, "any of claims" should read "claim"

Column 5, claim 14,
Line 30, "holes intended for nails" should be deleted

Signed and Sealed this

Sixth Day of November, 2001

Attest:

NICHOLAS P. GODICI
*Attesting Officer*   *Acting Director of the United States Patent and Trademark Office*